(12) United States Patent
Wigard et al.

(10) Patent No.: US 10,998,960 B2
(45) Date of Patent: May 4, 2021

(54) PROVIDING REFERENCE ALTITUDE INFORMATION TO UNMANNED AERIAL VEHICLES FOR CONFIGURATION DIFFERENTIATION

(71) Applicant: NOKIA TECHNOLOGIES OY, Espoo (FI)

(72) Inventors: Jeroen Wigard, Klarup (DK); István Zsolt Kovács, Aalborg (DK); Jedrzej Stanczak, Poznan (PL); Dawid Koziol, Glogow (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/652,548

(22) PCT Filed: Nov. 17, 2017

(86) PCT No.: PCT/EP2017/079594
§ 371 (c)(1),
(2) Date: Mar. 31, 2020

(87) PCT Pub. No.: WO2019/096403
PCT Pub. Date: May 23, 2019

(65) Prior Publication Data
US 2020/0244343 A1 Jul. 30, 2020

(51) Int. Cl.
*H04W 4/40* (2018.01)
*H04B 7/185* (2006.01)
(Continued)

(52) U.S. Cl.
CPC ....... *H04B 7/18506* (2013.01); *G05D 1/0022* (2013.01); *G05D 1/0607* (2013.01);
(Continued)

(58) Field of Classification Search
CPC ....... H04W 4/027; H04W 4/046; H04W 4/06; H04W 72/005; H04W 84/06;
(Continued)

(56) References Cited

U.S. PATENT DOCUMENTS

| 9,537,561 B1 | 1/2017 | Kotecha et al. |
| 2016/0300493 A1 | 10/2016 | Ubhi et al. |

(Continued)

OTHER PUBLICATIONS

International Search Report and Written Opinion dated Jul. 19, 2018 corresponding to International Patent Application No. PCT/EP2017/079594.

*Primary Examiner* — Jean A Gelin
(74) *Attorney, Agent, or Firm* — Squire Patton Boggs (US) LLP

(57) ABSTRACT

An apparatus and method that may receive, at an unmanned aerial vehicle, at least one coordinate from a base station, wherein the at least one coordinate comprises one or more reference altitude values associated with at least one of an altitude of an antenna associated with the base station or a ground altitude of the base station. The method may further determine that the unmanned aerial vehicle is within a first three-dimensional zone of a plurality of three-dimensional zones based on the one or more reference altitude values. The method may further adjust mobile network settings of the unmanned aerial vehicle based on the determined first three-dimensional zone.

18 Claims, 8 Drawing Sheets

(51) Int. Cl.
    *H04W 76/27* (2018.01)
    *G05D 1/00* (2006.01)
    *G05D 1/06* (2006.01)
    *G08G 5/00* (2006.01)
    *H04W 4/021* (2018.01)
    *H04W 16/18* (2009.01)
    *H04W 16/30* (2009.01)

(52) U.S. Cl.
    CPC .......... *G08G 5/0069* (2013.01); *H04W 4/021* (2013.01); *H04W 4/40* (2018.02); *H04W 16/18* (2013.01); *H04W 16/30* (2013.01); *H04W 76/27* (2018.02)

(58) Field of Classification Search
    CPC ....... H04W 4/021; H04W 4/40; H04W 16/18; H04W 16/30; B64C 2201/146; B64C 39/024; B64C 2201/027; B64C 2201/145; B64C 2201/14; G08G 5/0069; G08G 5/0078; G08G 5/0095; G08G 5/006; H04B 7/18506; H04B 7/18504; H04B 7/318

See application file for complete search history.

(56) References Cited

U.S. PATENT DOCUMENTS

| | | |
|---|---|---|
| 2017/0150373 A1 | 5/2017 | Brennan et al. |
| 2017/0248969 A1* | 8/2017 | Ham .................... G08G 5/0069 |
| 2018/0046180 A1* | 2/2018 | Falk ...................... G08C 17/02 |
| 2018/0120829 A1* | 5/2018 | Price ....................... B64C 27/20 |
| 2018/0204469 A1* | 7/2018 | Moster .................. B64C 39/024 |
| 2019/0317530 A1* | 10/2019 | Yang .................... G08G 5/0086 |
| 2020/0020236 A1* | 1/2020 | Zhou ..................... G08G 5/006 |
| 2020/0023236 A1* | 1/2020 | Chen .................. A63B 24/0062 |
| 2020/0105151 A1* | 4/2020 | Mahkonen ........... G08G 5/0008 |

\* cited by examiner

PROVIDING REFERENCE ALTITUDE INFORMATION TO UNMANNED AERIAL VEHICLES FOR CONFIGURATION DIFFERENTIATION

BACKGROUND

Field

Certain embodiments may relate to unmanned aerial vehicles, for example, some embodiments may relate to communications between a communication system that supports an unmanned aerial vehicle operation and an unmanned aerial vehicle.

Description of the Related Art

The use of unmanned aerial vehicles (UAVs) has increased in recent years, including in commercial, recreational, military, scientific, and other applications. By offering lower costs and lower risks, UAVs have the ability to perform tasks which would otherwise be limited by the need for a human pilot.

In order to provide safe and efficient airspace for UAVs, UAV traffic management (UTM) systems have emerged that control one or more UAVs through a control link, such as a command and control (C2) link. Such control links may be provided through a terrestrial communication system, such as a 3GPP Long-Term Evolution (LTE) or a 5th generation network. In addition to the control link, UAVs may also have communication needs that are supported separately from a UTM system, such as an uplink for video streaming from an on-board camera and/or a connection for user equipment used by passengers on board the UAV, such as a wide local area network (WLAN).

The emergence of UAV technology has also created challenges for existing communication systems. For example, UAVs are capable of communicating with more ground-based network entities, such as an evolved Node B (eNB), compared to ground-based user equipment, which may result in greater uplink interference experienced by each ground-based network entity. In addition, UAVs may also have more ground-based network entities that are candidates for handover procedures. Without limitations on how handover procedures occur with this increased number of handover candidates, UAVs may waste network resources by causing unnecessary handovers.

SUMMARY

In accordance with an embodiment, a method may include receiving, at an unmanned aerial vehicle, at least one coordinate from a base station. The at least one coordinate comprises at least one of one or more reference altitude values and a height threshold. The method may further include determining that the unmanned aerial vehicle is within a first three-dimensional zone of a plurality of three-dimensional zones based on at least one of the one or more reference altitude values and the height threshold. The method may also include adjusting mobile network settings of the unmanned aerial vehicle based on the determined first three-dimensional zone.

In accordance with an embodiment, an apparatus may include at least one processor and at least one memory including computer program code. The at least one memory and the computer program code may be configured to, with the at least one processor, cause the apparatus to at least receive, at an unmanned aerial vehicle, at least one coordinate from a base station. The at least one coordinate comprises at least one of one or more reference altitude values and a height threshold. The at least one memory and the computer program code may be further configured to, with the at least one processor, cause the apparatus to at least determine that the unmanned aerial vehicle is within a first three-dimensional zone of a plurality of three-dimensional zones based on at least one of the one or more reference altitude values and the height threshold. The at least one memory and the computer program code may be further configured to, with the at least one processor, cause the apparatus to at least adjust mobile network settings of the unmanned aerial vehicle based on the determined first three-dimensional zone.

In accordance with an embodiment, an apparatus may include means for receiving, at an unmanned aerial vehicle, at least one coordinate from a base station. The at least one coordinate comprises at least one of one or more reference altitude values and a height threshold. The apparatus may further include means for determining that the unmanned aerial vehicle is within a first three-dimensional zone of a plurality of three-dimensional zones based on at least one of the one or more reference altitude values and the height threshold. The apparatus may further include means for adjusting mobile network settings of the unmanned aerial vehicle based on the determined first three-dimensional zone.

A non-transitory computer readable medium may, in certain embodiments, be encoded with instructions that, when executed in hardware, perform a process. The process may include a method for receiving, at an unmanned aerial vehicle, at least one coordinate from a base station. The at least one coordinate comprises at least one of one or more reference altitude values and a height threshold. The process may further include a method for determining that the unmanned aerial vehicle is within a first three-dimensional zone of a plurality of three-dimensional zones based on at least one of the one or more reference altitude values and the height threshold. The process may further include a method for adjusting mobile network settings of the unmanned aerial vehicle based on the determined first three-dimensional zone.

A computer program product may, according to certain embodiments, encode instructions for performing a process. The process may include a method that can receive, at an unmanned aerial vehicle, at least one coordinate from a base station. The at least one coordinate comprises at least one of one or more reference altitude values and a height threshold. The process may further include a method that can determine that the unmanned aerial vehicle is within a first three-dimensional zone of a plurality of three-dimensional zones based on at least one of the one or more reference altitude values and the height threshold. The process may further include a method that can adjust mobile network settings of the unmanned aerial vehicle based on the determined first three-dimensional zone.

In accordance with an embodiment, a method may include obtaining, by a network entity, one or more of one or more reference altitude values and a height threshold. The method may further include transmitting, by the network entity, one or more of the one or more reference altitude values and the height threshold to one or more unmanned aerial vehicles. The method may further include receiving, by the network entity, one or more coordinate values from the one or more unmanned aerial vehicles. The method may further include communicating, by the network entity, one or more mobile network settings that correspond to one or more three-dimensional zones that the one or more unmanned aerial vehicles are inside.

In accordance with an embodiment, an apparatus may include at least one processor and at least one memory including computer program code. The at least one memory and the computer program code may be configured to, with the at least one processor, cause the apparatus to at least obtain one or more of one or more reference altitude values and a height threshold. The at least one memory and the computer program code may be further configured to, with the at least one processor, cause the apparatus to at least transmit one or more of the one or more reference altitude values and the height threshold to one or more unmanned aerial vehicles. The at least one memory and the computer program code may be further configured to, with the at least one processor, cause the apparatus to at least receive one or more coordinate values from the one or more unmanned aerial vehicles. The at least one memory and the computer program code may be further configured to, with the at least one processor, cause the apparatus to at least communicate one or more mobile network settings that correspond to one or more three-dimensional zones that the one or more unmanned aerial vehicles are inside.

In accordance with an embodiment, an apparatus may include means for obtaining one or more of one or more reference altitude values and a height threshold. The apparatus may further include means for transmitting one or more of the one or more reference altitude values and the height threshold to one or more unmanned aerial vehicles. The apparatus may further include means for receiving one or more coordinate values from the one or more unmanned aerial vehicles. The apparatus may further include means for communicating one or more mobile network settings that correspond to one or more three-dimensional zones that the one or more unmanned aerial vehicles are inside.

A non-transitory computer readable medium may, in certain embodiments, be encoded with instructions that, when executed in hardware, perform a process. The process may include a method for obtaining, by a network entity, one or more of one or more reference altitude values and a height threshold. The process may further include a method for transmitting, by the network entity, one or more of the one or more reference altitude values and the height threshold to one or more unmanned aerial vehicles. The method may further include a method for receiving, by the network entity, one or more coordinate values from the one or more unmanned aerial vehicles. The method may further include a method for communicating, by the network entity, one or more mobile network settings that correspond to one or more three-dimensional zones that the one or more unmanned aerial vehicles are inside.

A computer program product may, according to certain embodiments, encode instructions for performing a process. The process may include a method that can obtain one or more of one or more reference altitude values and a height threshold. The process may further include a method that can transmit one or more of the one or more reference altitude values and the height threshold to one or more unmanned aerial vehicles. The process may further include a method that can receive one or more coordinate values from the one or more unmanned aerial vehicles. The process may further include a method that can communicate one or more mobile network settings that correspond to one or more three-dimensional zones that the one or more UAVs are inside.

BRIEF DESCRIPTION OF THE DRAWINGS

For proper understanding of this disclosure, reference should be made to the accompanying drawings, wherein.

DETAILED DESCRIPTION

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments. Some embodiments discussed below relate to LTE 5th generation technology, but other embodiments may relate to LTE-A, LTE 4th generation, Internet of Things (IoT), and new radio (NR) technology.

Figure 1:
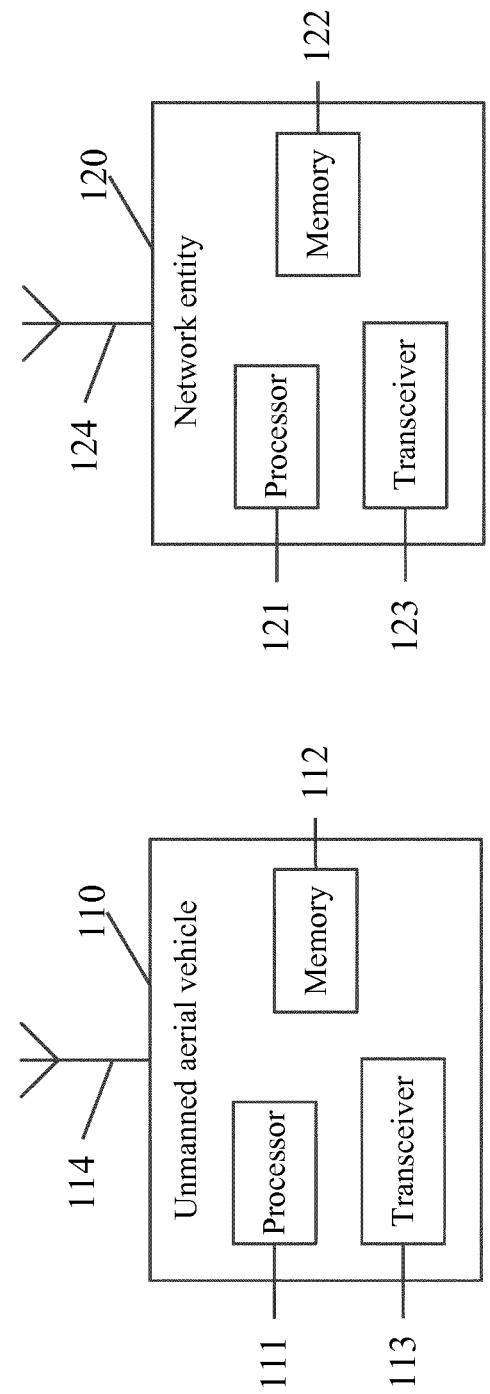
FIG. 1 illustrates an example of a system according to certain embodiments.

FIG. 1 illustrates a system according to certain embodiments. In one embodiment, a system may include multiple devices, such as, for example, unmanned aerial vehicle (UAV) 110 and network entity 120. UAV 110 may include one or more aircraft, such as drones. Network entity 120 may include a next generation radio access network, mobility management entity, serving gateway, base station, such as an evolved node B (eNB) or next generation node B (gNB), a server, and/or other access node. In some embodiments, network entity 120 may also be an unmanned aerial vehicle, such as a flying next generation radio access network, mobility management entity, serving gateway, base station, such as an evolved node B (eNB) or next generation node B (gNB), a server, and/or other access node.

One or more of these devices may include at least one processor, respectively indicated as 111 and 121. At least one memory may be provided in one or more of devices indicated at 112 and 122. The memory may be fixed or removable. The memory may include computer program instructions or computer code contained therein. Processors 111 and 121 and memory 112 and 122, or a subset thereof, may be configured to provide means corresponding to the various blocks of FIGS. 2-8. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 1, transceiver 113 and 123 may be provided, and one or more devices may also include at least one antenna, respectively illustrated as 114 and 124. The device may have many antennas, such as an array of antennas configured for multiple input multiple output (MIMO) communications, or multiple antennas for multiple radio access technologies. Other configurations of these devices, for example, may be provided.

Transceiver 113 and 123 may be a transmitter, a receiver, or both a transmitter and a receiver, or a unit or device that may be configured both for transmission and reception.

Processor 111 and 121 may be embodied by any computational or data processing device, such as a central processing unit (CPU), application specific integrated circuit (ASIC), or comparable device. The processors may be implemented as a single controller, or a plurality of controllers or processors.

Memory 112 and 122 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language.

The memory and the computer program instructions may be configured, with the processor for the particular device, to cause a hardware apparatus such as user equipment to perform any of the processes described below (see, for example, FIGS. 7 and 8). Therefore, in certain embodiments, a non-transitory computer-readable medium may be encoded with computer instructions that, when executed in hardware, perform a process such as one of the processes described herein. Alternatively, certain embodiments may be performed entirely in hardware.

Figure 2:
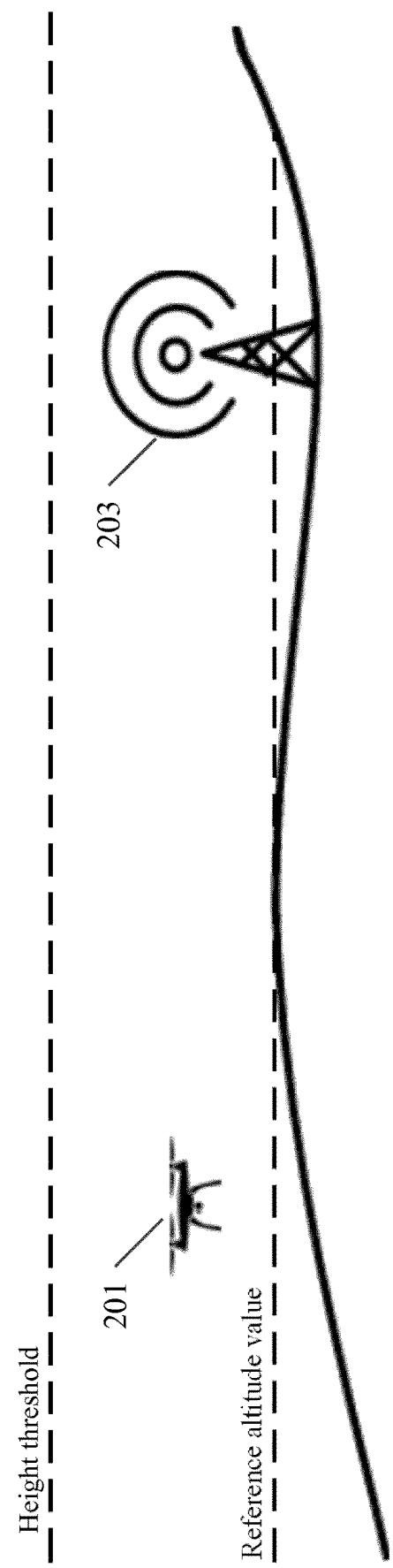
FIG. 2 illustrates another example of a system according to certain embodiments.

FIG. 2 illustrates an environment including a height threshold and a reference altitude value. In some embodiments, the reference altitude value may be equal to, for example, the height of a base station antenna, an average local terrain profile height, and/or an average building height. For example, an average local terrain profile height may include the average altitude and/or elevation above sea level of the geographical terrain where one or more ground-based network entities are located. In certain embodiments, the height threshold may be a predefined distance above or below a height of a base station antenna, and/or a predefined distance above or below a reference altitude value. For example, a height threshold that is a certain number of meters above or below the height of a base station antenna may be used in a mountainous area, and/or a height threshold that is a certain number of meters above or below a reference altitude value may be used in an urban area. In certain embodiments, UAV 201 and antenna 203 may correspond with UAV 110 and/or network entity 120, respectively.

In some embodiments, antenna 203 may receive one or more values corresponding to one or more of reference altitude values and a height threshold from a central node entity, or may derive one or more of one or more reference altitude values and a height threshold. In addition, one or more of one or more reference altitude values and a height threshold may be transmitted to one or more UAVs. In certain embodiments, antenna 203 may receive three-dimensional coordinates from UAV 201. Based upon the three-dimensional coordinates received from UAV 201, antenna 203 may receive and transmit data with UAV 201 based upon mobile network settings corresponding to one or more three-dimensional zones that UAV 201 is currently occupying.

Figure 3:
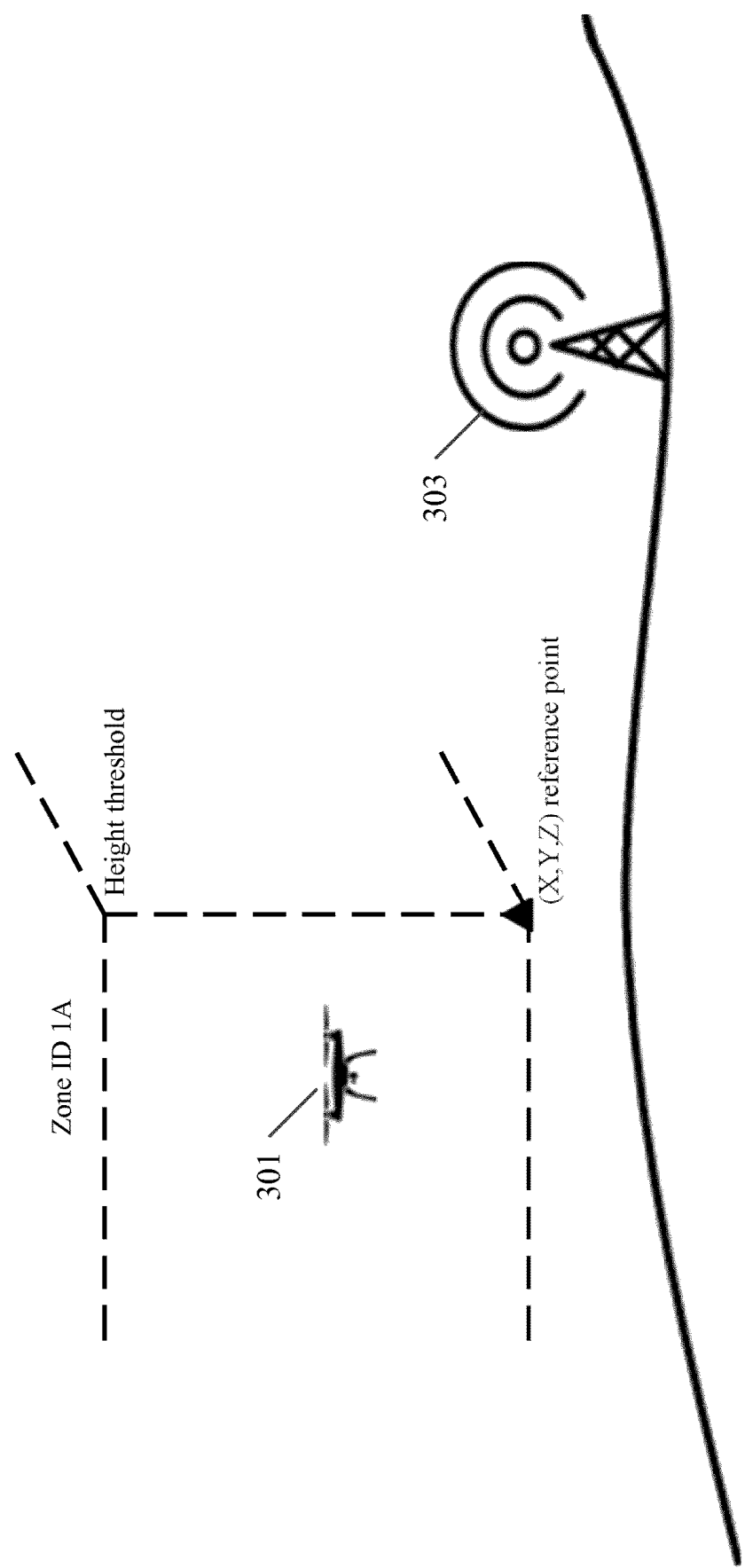
FIG. 3 illustrates another example of a system according to certain embodiments.

FIG. 3 illustrates an environment including a three-coordinate reference point, such as (X,Y,Z) reference point. In some embodiments, the three-coordinate reference point may be combined with a height threshold to generate a three-dimensional space, such as Zone Identifier (ID) 1A. In some embodiments, UAV 301 may move inside and outside of Zone ID 1A. In certain embodiments, UAV 301 and antenna 303 may correspond with UAV 110 and/or network entity 120.

Figure 4:
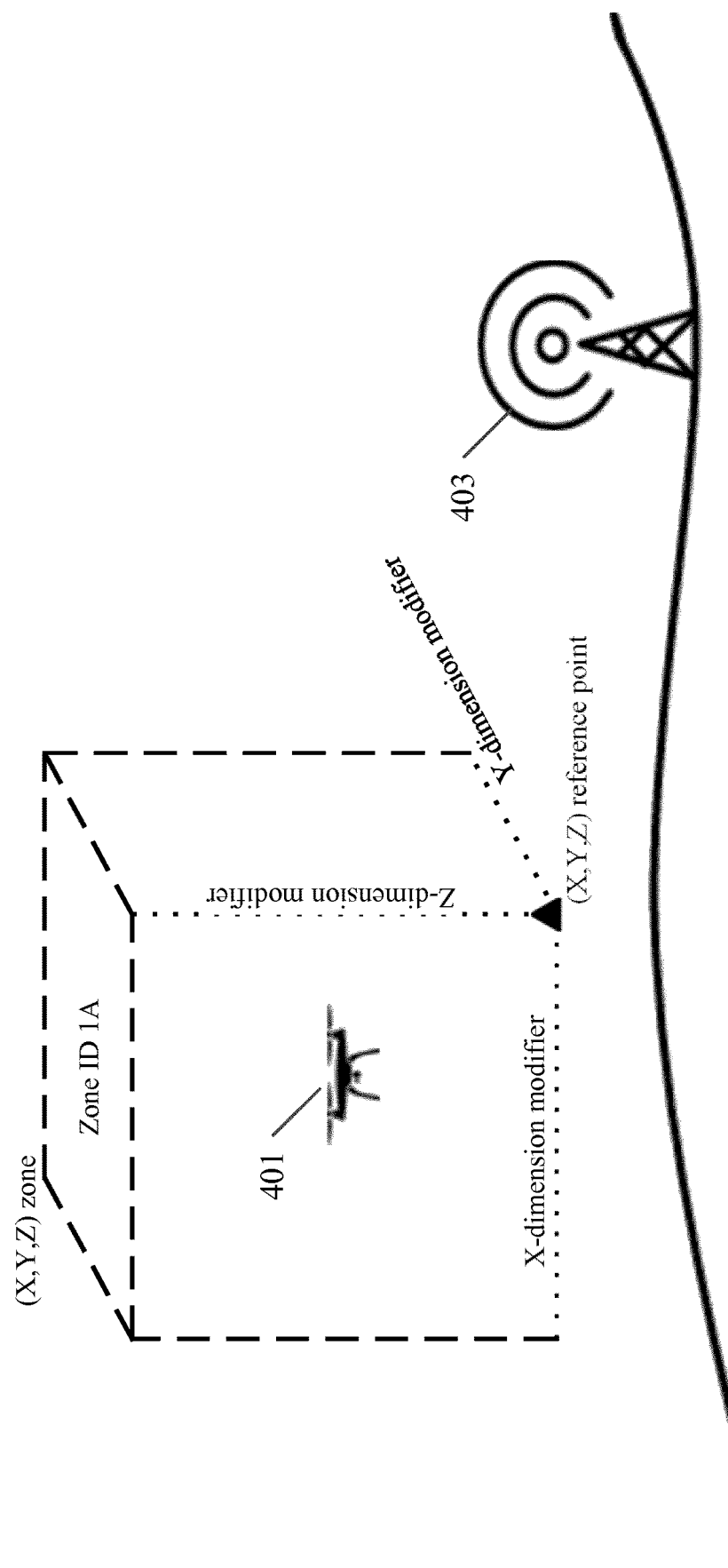
FIG. 4 illustrates another example of a system according to certain embodiments.

FIG. 4 illustrates an environment where a three-coordinate reference point, such as (X,Y,Z) reference point, may be combined with modifiers in each of the x, y, and z dimensions. In certain embodiments, the combination of the three-coordinate reference point and modifiers may generate a three-dimensional zone, such as Zone ID 1A in the shape of a cube. However, any three-dimensional shape may be defined as the three-dimensional zone. In some embodiments, UAV 401 may move inside and outside of Zone ID 1A. In certain embodiments, UAV 401 and antenna 403 may correspond with UAV 110 and/or network entity 120.

In some embodiments, one or more of the height threshold, x-dimension modifier, y-dimension modifier, and z-dimension modifier may be determined by one or more of a base station and a central network entity. For example, one or more of the height threshold, x-dimension modifier, y-dimension modifier, and z-dimension modifier may be determined by one or more of a network entity and a central network entity based upon one or more of radio propagation characteristics, traffic load, one or more network element antenna configurations, and one or more network element antenna locations.

Figure 5:
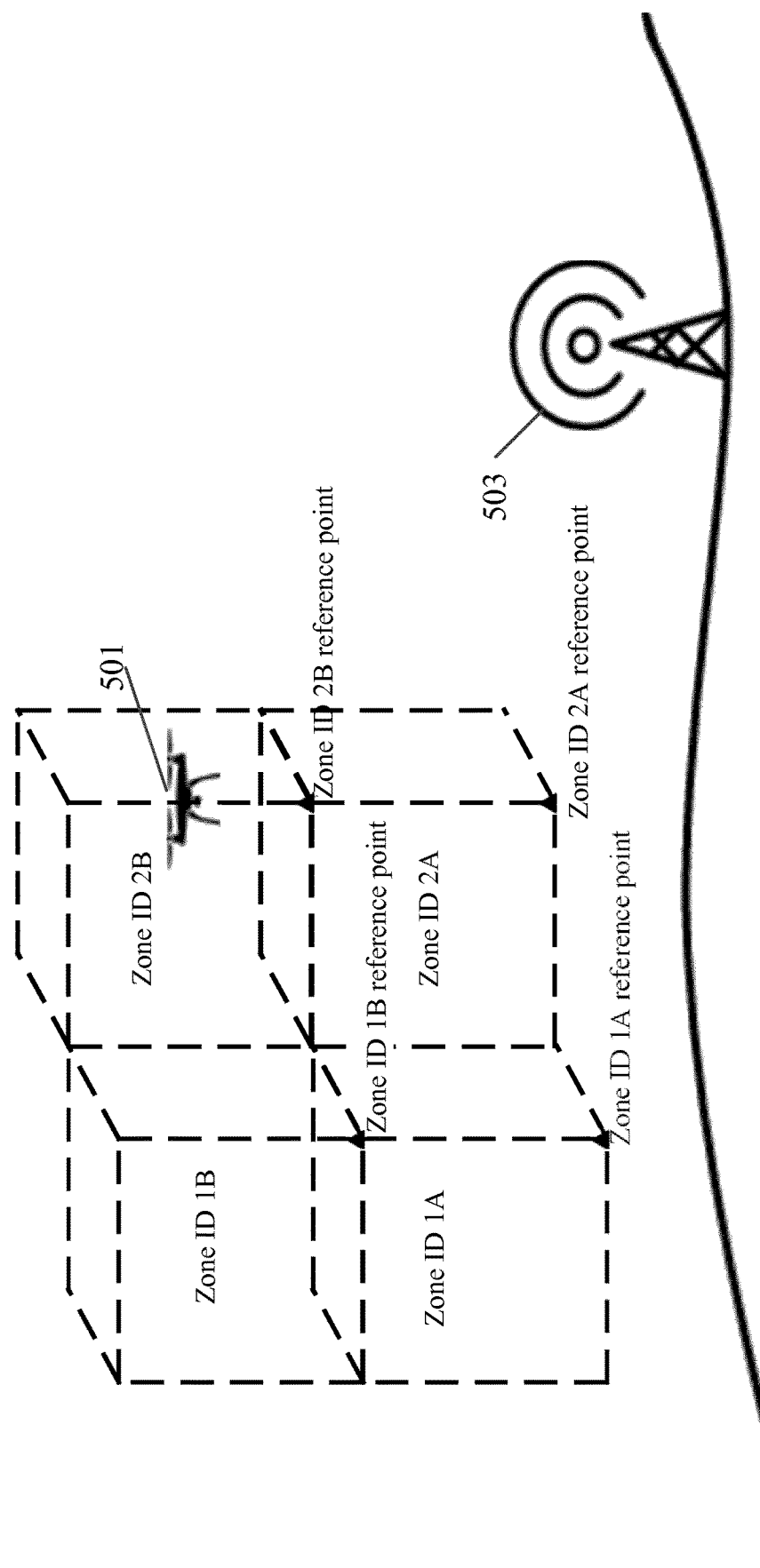
FIG. 5 illustrates another example of a system according to certain embodiments.

FIG. 5 illustrates an environment where multiple three-dimensional zones are defined by multiple three-coordinate reference points. For example, Zone ID 1A is defined by a first three-coordinate reference point, Zone ID 1B is defined by a second three-coordinate reference point, Zone ID 2A is defined by a third three-coordinate reference point, and Zone ID 2B is defined by a fourth three-coordinate reference point. In some embodiments, UAV 501 may move freely between any of the three-dimensional zones. When UAV 501 determines that UAV 501 has moved out of a first three-dimensional zone, and into a second three-dimensional zone, UAV 501 may adjust mobile network settings to those associated with the second three-dimensional zone. In certain embodiments, mobile network settings may be related to one or more UAV, and may include one or more of the power of an upload transmission, one or more radio handover parameters, the size of one or more data packets to be transmitted in one or more uplink transmission grants, a set of one or more allowed settings, and triggering and/or selection conditions to be standardized between one or more UAVs, UE, and/or base stations. In some embodiments, the mobile network settings that may be adjusted may be predetermined by the network entity based upon one or more of quality of service requirements, traffic type, UAV speed, one or more UAVs in communication with the network entity, and one or more UAVs operating within a certain distance of the network entity. In certain embodiments, the network entity may identify one or more three-dimensional zones for one or more UAV to operate in order to improve the overall radio performance of the network entity. In some embodiments, one or more scheduling grants may be transmitted from the network entity to one or more UAVs that includes configuration parameters that the one or more UAVs should immediately use and/or configuration parameters that the one or more UAVs should use upon one or more corresponding triggering conditions.

For example, when UAV 501 determines that UAV 501 has moved out of Zone ID 1A, and into Zone ID 2A, UAV 501 may adjust one or more UAV mobile network settings to those associated with Zone ID 2A. In certain embodiments, UAV 501 and network entity 503 may correspond with UAV 110 and/or network entity 120.

Figure 6:
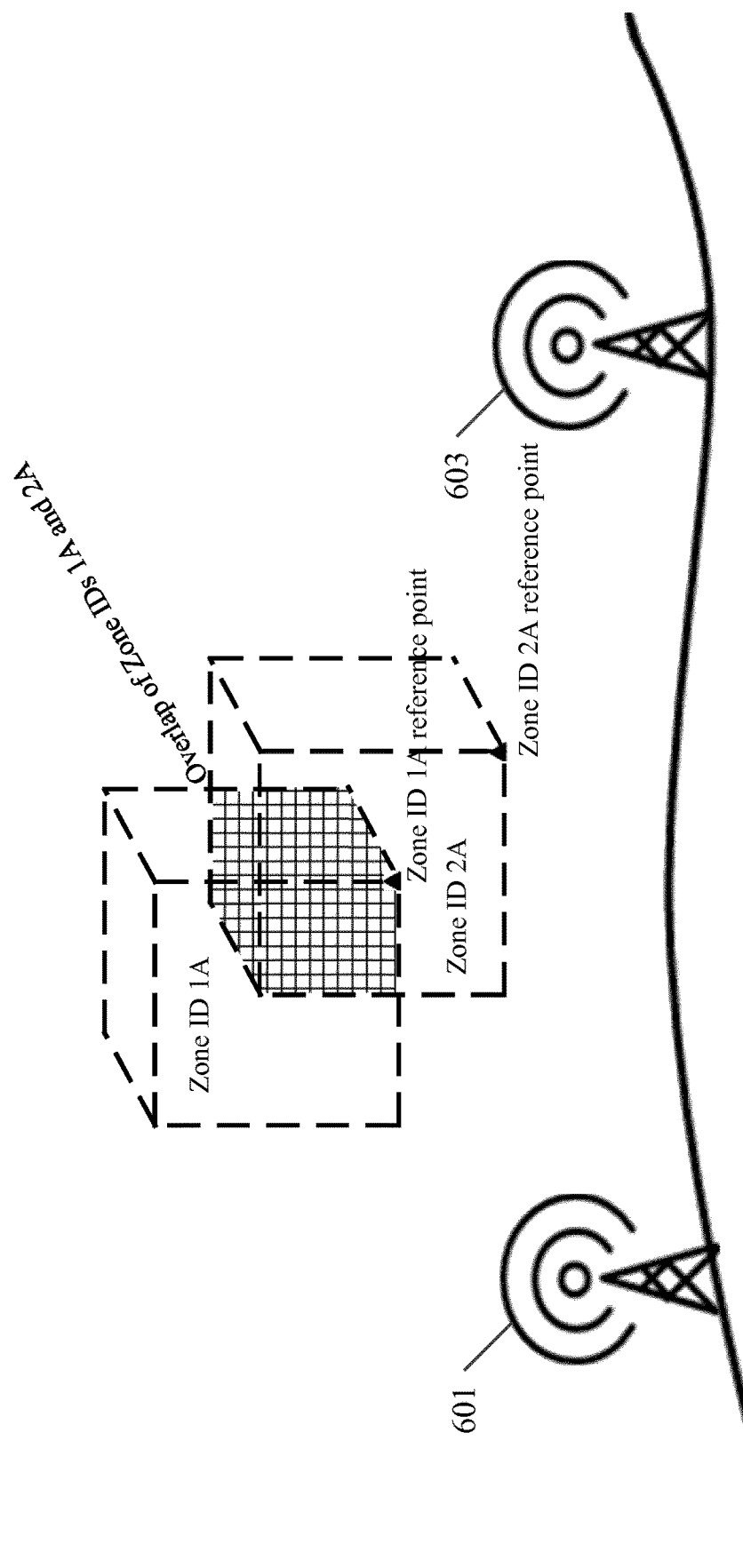
FIG. 6 illustrates another example of a system according to certain embodiments.

FIG. 6 illustrates an example of an environment where three-dimensional zones overlap. In some embodiments, a first network entity may provide one or more first three-dimensional zones, and a second network entity may provide one or more second three-dimensional zones, where one or more of the first three-dimensional zones overlap with one or more of the second three-dimensional zones. For example, FIG. 6 illustrates network entity 601 providing Zone ID 1A based upon a first reference point, a first x-dimension modifier, a first y-dimension modifier, and a first z-dimension modifier, and network entity 603 providing Zone ID 2A based upon a second reference point, a second x-dimension modifier, a second y-dimension modifier, and a second z-dimension modifier.

Figure 7:
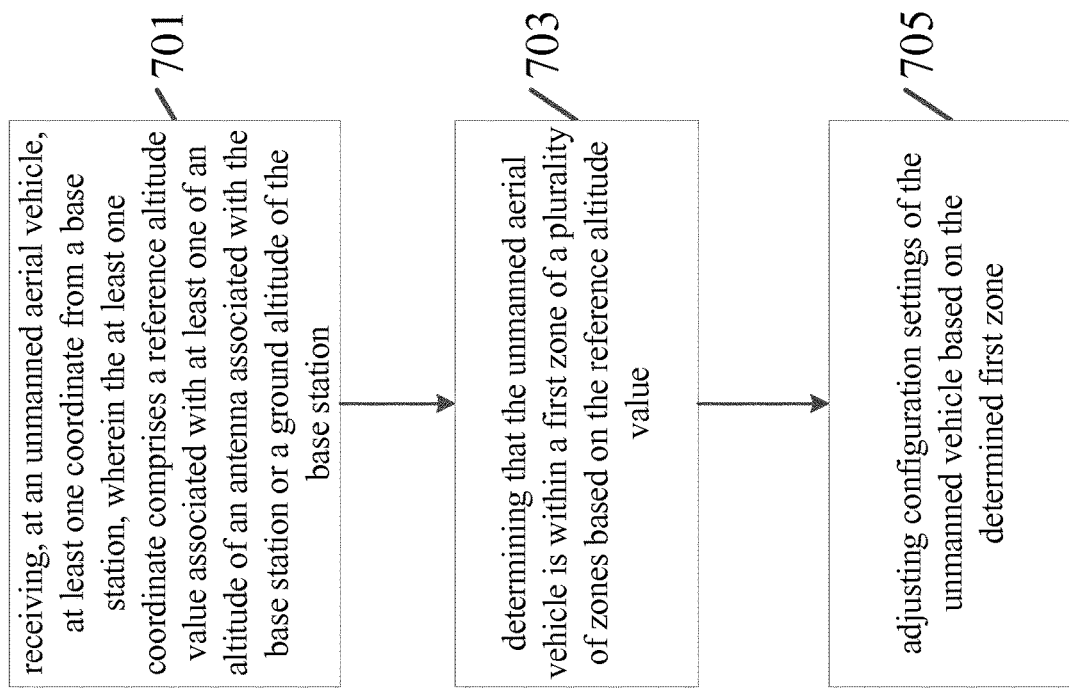
FIG. 7 illustrates an example of a method performed by an unmanned aerial vehicle according to certain embodiments.

FIG. 7 illustrates an example method of a UAV changing mobile network settings based upon a three-dimensional zone. In step 701, a UAV, such as UAV 201, may receive at least one coordinate from a base station. The at least one coordinate may include a reference altitude value associated, for example, with the altitude of an antenna associated with the base station and/or the ground altitude of the base station. In some embodiments, the at least one coordinate may be received from the base station by system information blocks or radio resource control protocol. In certain embodiments, a reference altitude value may indicate, for example, the altitude of an antenna corresponding to a network entity, or a ground altitude of the location of a network entity. In some embodiments, the UAV may determine its location and altitude, for example, by using a global navigation satellite system, and/or may compare its determined altitude to one or more values received from a network entity, and determine the relative location of the UAV.

In step 703, the UAV may determine that the UAV is within a first three-dimensional zone of a plurality of three-dimensional zones. In some embodiments, the one or more three-dimensional zones in the plurality of three-dimensional zones may be defined by a reference position comprising an x-dimension modifier, a y-dimension modifier, and a z-dimension modifier. In certain embodiments, one or more three-dimensional zones in the plurality of three-dimensional zones may be defined by an x-dimension modifier, a y-dimension modifier, and a z-dimension modifier.

In step 705, the UAV may adjust mobile network settings based upon the determined first three-dimensional zone. In some embodiments, the UAV may move from the first three-dimensional zone into a second three-dimensional zone, and determine that the UAV has moved from the first three-dimensional zone into the second three-dimensional zone. The UAV may then adjust UAV mobile network settings based upon the determined second three-dimensional zone.

Figure 8:
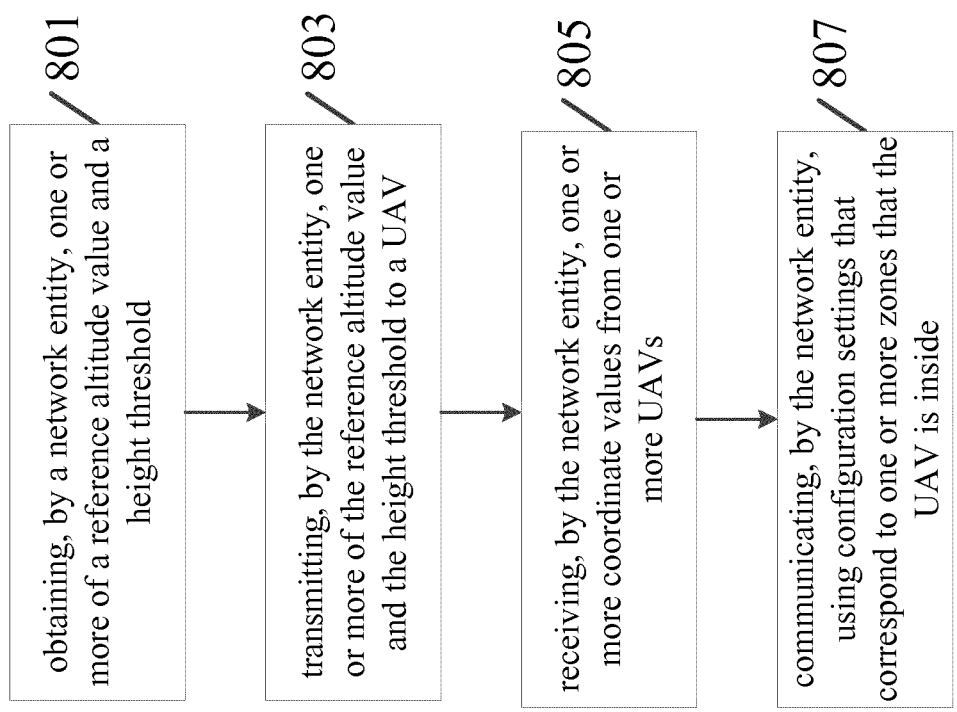
FIG. 8 illustrates an example of a method performed by a network entity according to certain embodiments.

FIG. 8 illustrates an example method of a network entity. In step 801, a network entity may obtain one or more of one or more reference altitude values and a height threshold from a UAV. In some embodiments, the network entity may obtain one or more of one or more reference altitude values and a height threshold from a central node entity. In certain embodiments, the network entity may obtain one or more of one or more reference altitude values and a height threshold by using radio resource management techniques.

In step 803, the network entity transmits one or more of the one or more reference values and the height threshold to the UAV. In some embodiments, the network entity may encode the one or more of the one or more reference values and the height threshold. In certain embodiments, the network entity may transmit the one or more of the one or more reference altitude values and the height threshold to a UAV using broadcast signaling or dedicated signaling. In step 805, the network entity may receive one or more coordinate values from one or more UAVs. In step 807, the network entity may communicate with the UAV using mobile network settings that correspond to one or more three-dimensional zones that the UAV is inside.

Certain embodiments of the present invention may have various benefits and/or advantages. For example, certain embodiments are directed to improvements in computer-related technology, specifically, by providing techniques that reduce interference with ground-based network entities and unnecessary handover procedures, conserving limited network resources and power. For example, the present invention may provide one or more of more stable radio channel conditions and connectivity, lower power consumption of network entities, and an improved connectivity radio range. Furthermore, the present invention may also provide benefits to the network by decreasing interference, improving spectral efficiency and capacity, improving UAV capacity, and increasing the number of UAVs that may be served by one or more network entities. Some embodiments of the present invention may lower or eliminate degradation in the performance of the ground-based network entities.

In addition, video-streaming rates may be reduced, and/or inter-cell interference coordination (ICIC) may be implemented. In addition, UAVs may utilize one or more handover or other mobile network settings that differ from ground-based user equipment, and/or automatic neighbor relation (ANR) techniques may differ from those of ground-based user equipment. For example, the one or more handover or other mobile network settings may include one or more handover triggering thresholds and differences between the serving cell radio channel quality and target cell radio channel quality. Finally, dynamic beamforming techniques may be used to target communication signals.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL GLOSSARY

3GPP 3rd Generation Partnership Project
ANR Automatic Neighbor Relation

BTS Base Transceiver Station
BVLOS Beyond Visual Line of Sight
C2 Command and Control
CN Core Network
eNB Enhanced Node B
EPS Evolved Packet System
GPS Global Positioning System
ICIC Inter-Cell Interference Coordination
ID Identifier
GNSS Global Navigation Satellite System
LOS Line of Sight
LTE Long-Term Evolution
Mbps Megabits per second
MEC Mobile Edge Computing
mMTC Massive Machine Type Communications
ngNB Next Generation Node B
NW Network
RA Radio Access
RAN Radio Access Network
RNTI Radio Network Temporary Identifier
RRC Radio Resource Control
SIB System Information Block
UAV Unmanned Aerial Vehicle
UE User Equipment
UTM Unmanned Aerial Vehicle Traffic Management
VLOS Visual Line of Sight

We claim:

1. A method, comprising:
   receiving, at an unmanned aerial vehicle, at least one coordinate from a base station, wherein the at least one coordinate comprises at least one of one or more reference altitude values and a height threshold, wherein the height threshold is a predefined distance above or below the one or more reference altitude values;
   determining that the unmanned aerial vehicle is within a first three-dimensional zone of a plurality of three-dimensional zones based on at least one of the one or more reference altitude values and the height threshold; and
   adjusting one or more mobile network settings of the unmanned aerial vehicle based on the determined first three-dimensional zone.

2. The method according to claim 1, wherein the plurality of three-dimensional zones is defined by:
   a reference position comprising an x-value, a y-value, and the reference altitude value; or
   a three-dimensional zone depending on the reference position comprising an x-direction modifier, a y-direction modifier, and a z-direction modifier.

3. The method according to claim 1, wherein the at least one coordinate is received at the unmanned aerial vehicle from the base station by a system information block or a radio resource control dedicated signaling.

4. The method according to claim 1, further comprising:
   moving from the first three-dimensional zone to a second three-dimensional zone based on the reference altitude value;
   determining that the unmanned aerial vehicle has moved from the first three-dimensional zone into the second three-dimensional zone; and
   adjusting one or more mobile network settings of the unmanned aerial vehicle based upon the determined second three-dimensional zone.

5. The method according to claim 1, wherein the adjustment of the one or more mobile network settings of the unmanned aerial vehicle reduces interference with one or more of one or more ground-based base stations, one or more ground-based user equipment, and one or more UAV.

6. The method according to claim 1, wherein the at least one coordinate comprises one or more reference altitude values associated with at least one of an altitude of an antenna associated with the base station or a ground altitude of the base station.

7. A computer program embodied on a non-transitory computer-readable medium, said computer program comprising encoded instructions that, when executed in hardware, perform a process according to claim 1.

8. An apparatus, comprising:
   at least one processor; and
   at least one memory including computer program code,
   wherein the at least one memory and the computer program code are configured to, with the at least one processor, cause the apparatus to at least:
   receive, at an unmanned aerial vehicle, at least one coordinate from a base station, wherein the at least one coordinate comprises at least one of one or more reference altitude values and a height threshold, wherein the height threshold is a predefined distance above or below the one or more reference altitude values;
   determine that the unmanned aerial vehicle is within a first three-dimensional zone of a plurality of three-dimensional zones based on at least one of the one or more reference altitude values and the height threshold; and
   adjust one or more mobile network settings of the unmanned aerial vehicle based on the determined first three-dimensional zone.

9. The apparatus according to claim 8, wherein the plurality of three-dimensional zones are defined by:
   a reference position comprising an x-value, a y-value, and the reference altitude value; or
   a three-dimensional zone depending on the reference position comprising an x-dimension modifier, a y-dimension modifier, and a z-dimension modifier.

10. The apparatus according to claim 8, wherein the at least one coordinate is received at the unmanned aerial vehicle from the base station by a system information block or a radio resource control dedicated signaling.

11. The apparatus according to claim 8, further comprising:
   moving from the first three-dimensional zone to a second three-dimensional zone based on the reference altitude value;
   determining that the unmanned aerial vehicle has moved from the first three-dimensional zone into the second three-dimensional zone; and
   adjusting mobile network settings of the unmanned aerial vehicle based upon the determined second three-dimensional zone.

12. The apparatus according to claim 8, wherein the at least one coordinate comprises one or more reference altitude values associated with at least one of an altitude of an antenna associated with the base station or a ground altitude of the base station.

13. An apparatus, comprising:
   at least one processor; and
   at least one memory including computer program code,
   wherein the at least one memory and the computer program code are configured to, with the at least one processor, cause the apparatus to at least:
   obtain, by a network entity, one or more of one or more reference altitude values and a height threshold, wherein the height threshold is a predefined distance above or below the one or more reference altitude values;

transmit, by the network entity, one or more of the one or more reference altitude values and the height threshold to one or more unmanned aerial vehicles;

receive, by the network entity, one or more coordinate values from one or more unmanned aerial vehicles; and communicate, by the network entity, one or more mobile network settings that correspond with one or more three-dimensional zones that the one or more unmanned aerial vehicles are inside.

14. The apparatus according to claim 13, wherein the network entity obtains one or more of the one or more reference altitude values and the height threshold by using one or more of radio resource management techniques and network planning and configuration techniques.

15. The apparatus according to claim 13, wherein the network entity encodes the one or more of the one or more reference altitude values and the height threshold.

16. The apparatus according to claim 13, wherein the network entity transmits the one or more of the reference altitude values and the height threshold to a UAV using broadcast signaling or dedicated signaling.

17. The apparatus according to claim 13, wherein the one or more of the one or more reference altitude values and the height threshold obtained by the network entity are obtained by using one or more of radio resource management techniques and network planning and configuration techniques.

18. The apparatus according to claim 13, wherein the one or more of the one or more reference altitude values and the height threshold obtained from the network entity are encoded by the network entity.

* * * * *